US012320674B2

(12) United States Patent
Welle et al.

(10) Patent No.: US 12,320,674 B2
(45) Date of Patent: Jun. 3, 2025

(54) REMOVABLE DISPLAY AND OPERATING MODULE FOR A FIELD DEVICE

(71) Applicant: VEGA Grieshaber KG, Wolfach (DE)

(72) Inventors: Roland Welle, Hausach (DE); Manuel Kaufmann, Berghaupten (DE); Steffen Waelde, Niedereschach (DE)

(73) Assignee: VEGA Grieshaber KG, Wolfach (DE)

( * ) Notice: Subject to any disclaimer, the term of this patent is extended or adjusted under 35 U.S.C. 154(b) by 931 days.

(21) Appl. No.: 17/307,526

(22) Filed: May 4, 2021

(65) Prior Publication Data

US 2021/0356302 A1 Nov. 18, 2021

(30) Foreign Application Priority Data

May 15, 2020 (EP) ..................... 20174959

(51) Int. Cl.
*G01D 13/00* (2006.01)
*G01D 11/00* (2006.01)
(Continued)

(52) U.S. Cl.
CPC ........... *G01D 13/00* (2013.01); *G01D 11/245* (2013.01); *G01D 11/00* (2013.01); *G01D 11/24* (2013.01);
(Continued)

(58) Field of Classification Search
CPC ...... G01D 13/00; G01D 11/245; G01D 21/02; G01D 11/00; G01D 11/24; G01F 23/284; G01F 23/00
See application file for complete search history.

(56) References Cited

U.S. PATENT DOCUMENTS

| 7,885,610 B2 * | 2/2011 | Isenmann | ............ H04B 17/309 |
| | | | 702/140 |
| 8,839,669 B2 * | 9/2014 | Seibold | ................... H04Q 9/00 |
| | | | 73/431 |

(Continued)

FOREIGN PATENT DOCUMENTS

| CN | 1823452 A | 8/2006 |
| CN | 201853858 U | 6/2011 |

(Continued)

OTHER PUBLICATIONS

EP-3910298-A1; Kaufman et al., "Removable Display And Operating Module For E.g. Field Device, Has Electrical Connection Element Establishing Detachable Connection With Connection Counterpart For Transmission Of High-frequency Signals From Radio Module To Bushing", 2021. (Year: 2021).*

(Continued)

*Primary Examiner* — Kristina M Deherrera
*Assistant Examiner* — Tania Courson
(74) *Attorney, Agent, or Firm* — Oblon, McClelland, Maier & Neustadt, L.L.P.

(57) ABSTRACT

A removable display and operating module for a measuring device and/or a field device for level measurement or for limit level determination is provided, the removable display and operating module including a radio module; and an electrical connection element configured to form a detachable connection with a connection counterpart for transmitting radio frequency signals from the radio module to a radio frequency housing feedthrough and/or to an antenna of the measuring device and/or the field device. There is also provided a sensor housing for a field device for level measurement or for limit level determination, the sensor housing being configured to completely accommodate the removable display and operating module. A method of (Continued)

manufacturing a field device for level measurement or level limit determination is also provided.

15 Claims, 8 Drawing Sheets

(51) Int. Cl.
  *G01D 11/24* (2006.01)
  *G01D 21/02* (2006.01)
  *G01F 23/00* (2022.01)
  *G01F 23/284* (2006.01)

(52) U.S. Cl.
  CPC ............. *G01D 21/02* (2013.01); *G01F 23/00* (2013.01); *G01F 23/284* (2013.01)

(56) References Cited

U.S. PATENT DOCUMENTS

| | | | | |
|---|---|---|---|---|
| 9,046,404 | B2* | 6/2015 | Welle | G01F 25/20 |
| 10,306,343 | B2* | 5/2019 | Allgaier | H04Q 9/02 |
| 10,847,926 | B2* | 11/2020 | Zenuni | H04W 4/80 |
| 11,011,823 | B2* | 5/2021 | Schäuble | H01Q 9/0471 |
| 11,803,215 | B2* | 10/2023 | Deck | G06F 1/1607 |
| 2004/0183550 | A1 | 9/2004 | Fehrenbach et al. | |
| 2005/0164684 | A1* | 7/2005 | Chen | G06F 1/163 |
| | | | | 455/414.1 |
| 2005/0245291 | A1* | 11/2005 | Brown | G05B 19/4185 |
| | | | | 455/343.1 |
| 2008/0125175 | A1 | 5/2008 | Guenter et al. | |
| 2008/0126005 | A1* | 5/2008 | Guenter | G01F 23/14 |
| | | | | 702/140 |
| 2008/0183935 | A1 | 7/2008 | Guenter et al. | |
| 2009/0193169 | A9* | 7/2009 | Guenter | G01F 23/14 |
| | | | | 710/305 |
| 2009/0292996 | A1* | 11/2009 | Anne | G05B 19/0428 |
| | | | | 715/736 |
| 2010/0000316 | A1 | 1/2010 | Fehrenbach et al. | |
| 2010/0013462 | A1* | 1/2010 | Fink | H01H 9/181 |
| | | | | 324/207.2 |
| 2012/0126949 | A1* | 5/2012 | Downie | G06K 19/07749 |
| | | | | 340/10.1 |
| 2013/0320145 | A1 | 12/2013 | Mcgillis et al. | |
| 2014/0088893 | A1* | 3/2014 | McGuire | H02S 50/00 |
| | | | | 702/58 |
| 2014/0336988 | A1* | 11/2014 | Welle | G01D 9/00 |
| | | | | 702/188 |
| 2015/0039924 | A1 | 2/2015 | Allgaier et al. | |
| 2018/0110135 | A1* | 4/2018 | Sum | H05K 5/0221 |
| 2019/0219988 | A1* | 7/2019 | Weiss | G05B 19/4155 |
| 2019/0250019 | A1* | 8/2019 | Allgaier | G01L 19/0092 |
| 2020/0166411 | A1* | 5/2020 | Mårtensson | G01K 1/024 |
| 2020/0185812 | A1* | 6/2020 | Schäuble | H01Q 1/2233 |
| 2022/0164008 | A1* | 5/2022 | Deck | G06F 1/1607 |
| 2023/0243687 | A1* | 8/2023 | Garcia | G01D 11/28 |
| | | | | 73/290 R |
| 2023/0259089 | A1* | 8/2023 | Allgaier | H05K 5/0208 |
| | | | | 702/127 |

FOREIGN PATENT DOCUMENTS

| | | |
|---|---|---|
| CN | 202797545 U | 3/2013 |
| CN | 103261852 A | 8/2013 |
| CN | 108027599 A | 5/2018 |
| CN | 110574229 A | 12/2019 |
| EP | 1 925 918 A2 | 5/2008 |
| EP | 2 803 956 A1 | 11/2014 |
| EP | 2 829 929 A1 | 1/2015 |
| EP | 3 637 065 A1 | 4/2020 |
| WO | WO 2004/017025 A1 | 2/2004 |
| WO | WO 2011/113142 A1 | 9/2011 |
| WO | WO-2014040857 A1 * | 3/2014 ......... G05B 19/4185 |

OTHER PUBLICATIONS

DE-102009047060-A1; Stein et al., "Field Device With A Display Unit And Method For Operating The Display Unit", 2011. (Year: 2011).*

WO-2017059973-A1; Allgaier et al., "Field Device Comprising a Radio Module That Can Be Activated by an Actuating Element", Apr. 2017. (Year: 2017).*

European Office Action issued Jul. 1, 2021 in European Patent Application No. 20174959.5, 5 pages.

Extended European Search Report issued Oct. 22, 2020 in European Patent Application No. 20174959.5, 10 pages.

Me-Messsysteme: "Grundlagen zum CAN Bus", Retrieved from the internet: URL: https://www.mikrocontroller.net/attachment/6819/canbus.pdf [Retrieved on Oct. 7, 2020], Sep. 3, 2004, XP055737702, pp. 1-8 (with unedited computer generated English translation).

Combined Chinese Office Action and Search Report issued Jan. 22, 2024 in Chinese Patent Application No. 202110509458.X, 12 pages.

Combined Chinese Office Action and Search Report issued May 15, 2024 in Chinese Patent Application No. 202110509458.X (with English Translation of Category of cited Documents), 13 pages.

* cited by examiner

REMOVABLE DISPLAY AND OPERATING MODULE FOR A FIELD DEVICE

CROSS-REFERENCE TO RELATED APPLICATION

This application claims the benefit of the filing date of European Patent Application No. 20 174 959.5, filed on 15 May 2020, the entire content of which is incorporated herein by reference.

FIELD

The present disclosure relates to a measuring device, e.g., a field device, for level measurement, for limit level determination, for flow measurement, for pressure measurement, and/or for temperature measurement. In particular, the present disclosure relates to a field device with a radio module, a manufacturing method, and a use.

BACKGROUND

For level measurement or for limit level determination, measuring devices, especially field devices, are, in many cases, equipped with a radio module, for example to achieve simple integration of the devices into an automation system. Concepts for such automation systems are sometimes referred to as "Industry 4.0". At least some of the field devices are equipped with robust, metallic sensor housings to reduce damage due to environmental influences—e.g., mechanical stresses moisture, UV radiation, etc. However, the metallic sensor housing may at least reduce the range of radio waves from a radio module located inside the sensor housing.

SUMMARY

There may be a desire to at least partially improve the range of a radio module.

A first aspect of the present disclosure relates to a removable display and operating or control module for a measuring device and/or a field device for level measurement or level limit determination. The display and control module comprises a radio module and an electrical connection element adapted to form a detachable connection with a connection counterpart for transmitting radio frequency signals from the radio module to a radio frequency housing feedthrough and/or to an antenna of the field device.

The term "display and operating module" may be used in the following for a module of a field device that contains a radio module. This may be a display and operating module, a display module, a control module, a radio module, combinations thereof, and/or further embodiments of such a module. The removable display and operating module may, for example, be plugged into field device electronics and/or otherwise removably arranged within a sensor housing. In at least some embodiments, a modular concept may thus be realised, allowing, for example, different types of sensors to be combined with the display and operating module and/or other modules arranged at least partially within the sensor housing. The sensors may be, for example, an impedance limit switch, a vibration limit switch, a measuring device with a high frequency front end, ultrasonic front end or laser front end, and/or a radiometric measuring device. A modular concept for measuring instruments or field devices is realised, for example, in the modular system PLICS® from VEGA®. As an example of such a display and operating module, the display and operating module PLICSCOM® may be mentioned, which may be used for setup and adjustment of the PLICS® sensors.

For at least some use cases of process automation and/or in an automation system, it may be advantageous to equip the measuring device or field device with a radio module in order to wirelessly transmit, for example, measured values, data for predictive sensor and system maintenance, parameterisation data, and/or other types of data, e.g., to a user of the automation system and/or the field device, to a process control centre, a cloud, and/or to further receiving points. At least some of the radio standards used may be optimised for low energy consumption and/or high data throughput, for example. Since process automation devices are in many cases exposed to potentially damaging environmental influences, at least some of these devices may have a metallic sensor housing. The metallic sensor housing may be necessary, or at least useful, to reduce exposure to environmental factors such as temperature fluctuations, humidity, UV radiation, mechanical stresses, etc. However, the metallic sensor housing may interfere with the propagation of radio waves when the radio module is placed inside the housing. Also, at least some types of non-metallic sensor housings may also interfere with the propagation of the radio waves. This may be the case, for example, if the radio module is designed as part of the display and operating module; this arrangement may support the modular concept of the field device. However, the arrangement within the housing is opposed to requirements such as low power consumption and/or high data throughput. The electrical connection element, which is adapted to form a detachable connection with a connection counterpart for transmitting radio frequency signals from the radio module to a radio frequency housing feedthrough of the field device, can advantageously overcome these opposing requirements. In particular, the radio frequency housing feedthrough can be used to pass the radio frequency signals to an antenna and/or to connect an antenna, thus achieving high range, low power consumption and/or high data throughput. This can apply to both metallic sensor housings and non-metallic sensor housings. The high-frequency housing feed-through is a housing feedthrough that is set up for the transmission and/or forwarding of high frequencies. With this version of the display and operating module, information and communication systems of the so-called "Industry 4.0" may be used and/or integrated in a particularly simple manner.

In some embodiments, the electrical connection element is fixed to a printed circuit board. The electrical connection element can, for example, be soldered, glued, cast, welded, screwed, and/or otherwise fixed to a printed circuit board, circuit card, circuit board, and/or printed circuit. Advantageously, this provides a particularly easy-to-use connection that can be integrated into the production of the display and operating module without any effort.

In some embodiments, the electrical connection element is connected to the circuit board via a cable. The cable can, for example, be soldered to the circuit board and/or fixed in some other way. In one embodiment, the cable can be relatively short, e.g., only a few centimetres (cm) in length. In this way, a particularly flexible connection to the high-frequency housing can be realised.

In some embodiments, the electrical connection element is designed as a coaxial plug and the connection counterpart as a coaxial socket, or the electrical connection element is designed as a coaxial socket and the connection counterpart as a coaxial plug. The coaxial connection can be designed as a screw connection, a bayonet connection, and/or a plug-in connection. Coaxial cables and connectors have the advantage that they can conduct high-frequency electro-magnetic waves, such as those used for radio communication, with particularly low loss. Alternatively or additionally, other types of connections can also be used, e.g., twisted pair, or other RF connections, such as USB, Firebolt, etc.

In some embodiments, the electrical connection element is set up to transmit frequencies in an ISM band (ISM: Industrial, Scientific and Medical Band) and/or a telecommunications band. The telecommunication band may use, for example, radio networks such as 2G, 3G, LTE®, 5G™, etc. The ISM bands may, for example, be used by radio standards such as BLUETOOTH®, IEEE 802.15.4 (e.g., using ANT, BLUETOOTH®, ZIGBEE®), LoRa®, MIOTY®. For example, the radio module may support the protocols of a wireless personal area network (WPAN), a wireless LAN (WLAN), and/or a low power wide area network (LPWAN). The protocols and/or frequencies used may, for example, be optimised for low power consumption or high data throughput. The wireless device may be set up to transmit data to and/or receive data from a server and/or another measuring and/or display device.

Together with a modular concept for the field device, the display and operating module can be equipped and/or retrofittable with different types of communication protocols and/or frequencies to cover a wide range of requirements.

In some embodiments, the electrical connection element is adapted to transmit frequencies between 30 MHz and 20 GHz, for example between 100 MHz and 10 GHz, in particular between 100 MHz and 5 GHz. In these frequency ranges, the "outsourcing" of the antenna can be particularly advantageous for improving the transmission characteristics.

In some embodiments, the display and operating module is adapted to be arranged within a sensor housing. This arrangement may in particular support a modular concept for the construction of a field device.

One aspect relates to a sensor housing for a field device configured for level measurement or for limit level determination, which is configured to completely accommodate a display and operating module with a radio module and/or an electrical connection element as described above and/or below. In this case, the sensor housing has a high-frequency housing feedthrough, which is set up for transmitting high-frequency signals from the radio module and for connection to an antenna. The fact that the sensor housing completely accommodates these elements means that an effective protective function can be realised, e.g., against potentially damaging environmental influences.

In some embodiments, the high frequency housing feedthrough is a coaxial plug or a coaxial socket. For example, the housing feedthrough can be screwed into a thread of the sensor housing, e.g., into a thread, which is arranged on the sensor housing during manufacture for this application and which penetrates the sensor housing, e.g., in a sealable manner. A number of cable glands can be used for this purpose, for example PG glands, metric threads, NPT glands, and/or other types of glands. The high-frequency housing bushing is preferably robust.

In some embodiments, the electrical connection element is a coaxial connector or a coaxial socket. As connection types, i.e., how the antenna is connected to the coaxial cable, for example, coaxial connectors may be used, e.g., in the variants SMA, MCX, MMCX, SMP, and/or others.

In some embodiments, the antenna can be integrated into the sensor housing. The integrable antenna can be realised as a detachable or non-detachable part of the sensor housing.

One aspect relates to a method of manufacturing a field device for level measurement or level limit determination, comprising the steps: providing a sensor housing of the field device; arranging a high-frequency housing bushing and/or an antenna connected to a connection counterpart, i.e., a counterpart to an electrical connection element, on the sensor housing; connecting the connection counterpart to an electrical connection element connected to a radio module of a removable display and operating module; and arranging the display and operating module in the sensor housing, wherein the sensor housing completely accommodates the display and operating module and the connecting element.

The high-frequency housing bushing may realise an electrical and mechanical connection. The high-frequency housing bushing may, for example, be arranged on a wall, whereby an electrical feedthrough may be realised through the wall. The high-frequency housing bushing can, for example, be arranged in a housing bushing, which is arranged in a thread in the housing. The housing bushing can be designed in such a way that it protects the internal sensor electronics against environmental influences. After screwing in the housing bushing, the RF connectors, e.g., the electrical connection element and the connection counterpart, can be connected. Then the display and adjustment module can be connected to the sensor electronics, e.g., by means of the bayonet catches. Then the antenna can be connected to the connector of the housing feed-through. Advantages can further arise in the installation of the display and operating module. In some embodiments, e.g., in the PLICS® system from VEGA®, it can be provided that the electrical connection element is only plugged in when the housing bushing is screwed in.

In some embodiments, the method comprises the following further steps: placing an antenna on the sensor housing; and connecting the antenna to the high-frequency housing feedthrough.

The antenna may be arranged, e.g., on a wall of the sensor housing, the antenna can also be integrated and/or detachable in a plug-in manner. The connection can be made electrically and, if necessary, mechanically. As an alternative design, the antenna can be attached externally and/or, for example, be designed as a throwing antenna. Depending on the radio standard, different antennas can be used. The antennas can be adapted to the corresponding frequency range.

One aspect relates to a use of a measuring device, field device, measuring system and/or sensor housing as described above and/or below, or a method as described above and/or below for level measurement, for limit level determination, for pressure measurement and/or for temperature measurement.

For further clarification, the invention is described with reference to embodiments illustrated in the figures. These embodiments are to be understood only as examples and not as limitations. In the figures, the same reference signs denote the same or similar elements.

DETAILED DESCRIPTION OF EMBODIMENTS

Figure 1:
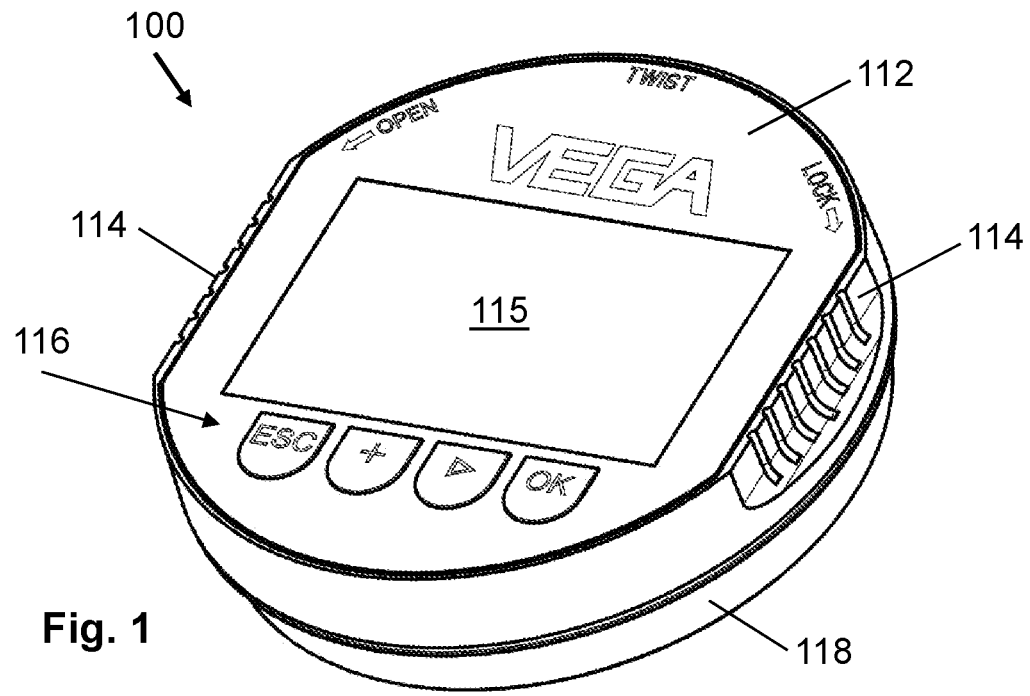
FIG. 1 shows a sketch of a display and operating module according to an embodiment in perspective view.
Figure 2:
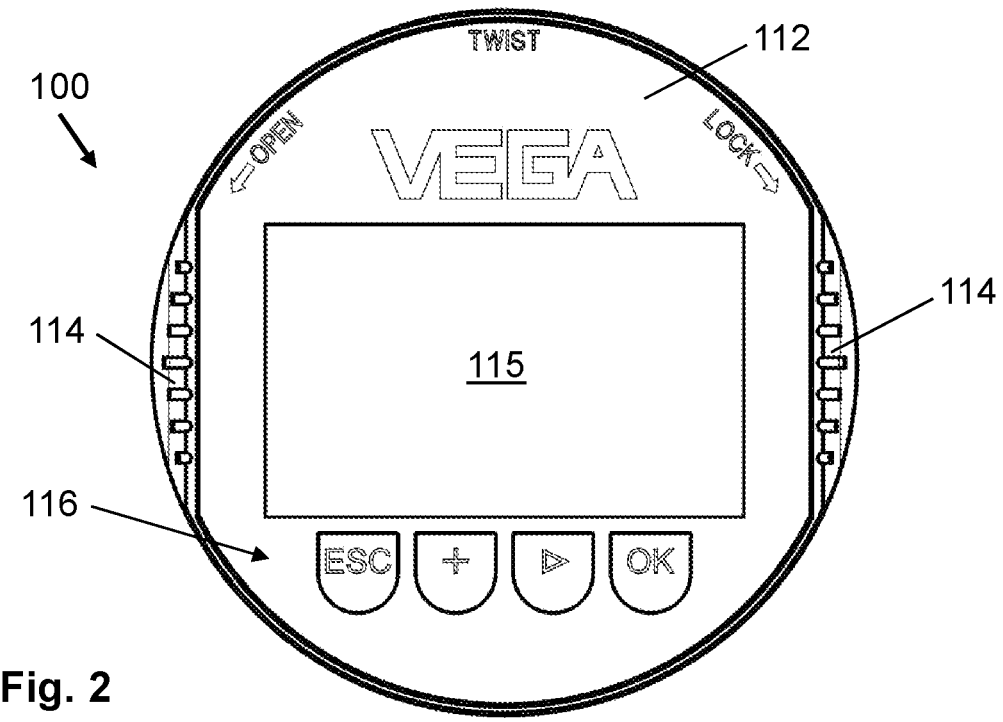
FIG. 2 shows a sketch of a display and operating module according to an embodiment in front view.
Figure 3:
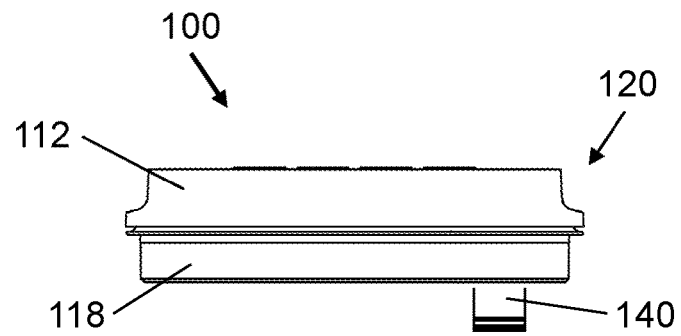
FIG. 3 shows a schematic sketch of a display and operating module according to an embodiment in side view.

FIG. 1 shows a sketch of a display and operating module 100 according to one embodiment in perspective view. The display and operating module 100 has an upper part 112 and a lower part 118. Side handles 114, a display 115, and control buttons (such as operator keys) 116 are arranged in the upper part 112. By means of the side handles 114, the display and operating module 100 can be easily removed or replaced. FIG. 2 shows a front view of the elements of the upper part 112 shown in FIG. 1. FIG. 3 shows a side view of the upper part 112 and the lower part 118 of a radio module 120 and the display and operating module 100. Furthermore, an electrical connection element 140 is shown, which in this embodiment protrudes from the lower part 118 and which can be designed, for example, as a coaxial connector.

Figure 4:
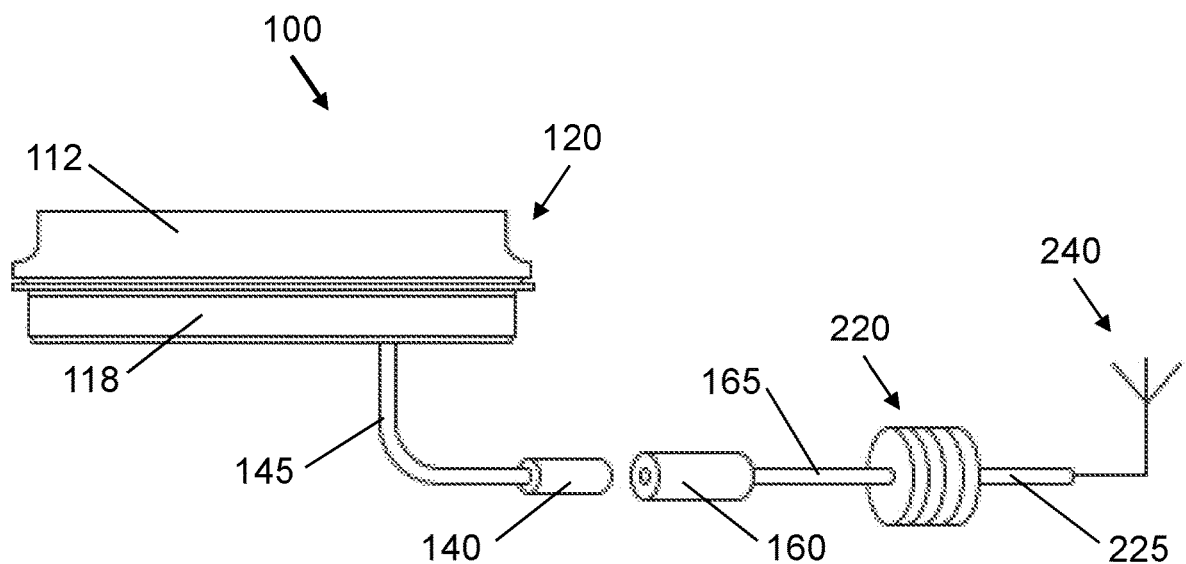
FIG. 4 shows a schematic sketch of a display and operating module with a connecting element and further elements according to a further embodiment.

FIG. 4 shows a schematic sketch of a radio module 120 and a display and operating module 100 with a connection element and further elements according to a further embodiment. Here, an electrical connection element 140 (e.g., a coaxial plug) is connected to the display and operating module 100 by a line 145 (e.g., a coaxial line). The electrical connection element 140 is connectable, i.e., electrically and/or mechanically connectable, to a connection counterpart 160 (e.g., a coaxial socket). The connection counterpart 160 is connected to a radio frequency housing feedthrough 220 via a line 165 (e.g., a coaxial line). From the radio frequency housing feedthrough 220, a line 225 (e.g., a coaxial line) is connected to an antenna 240.

Figure 5:
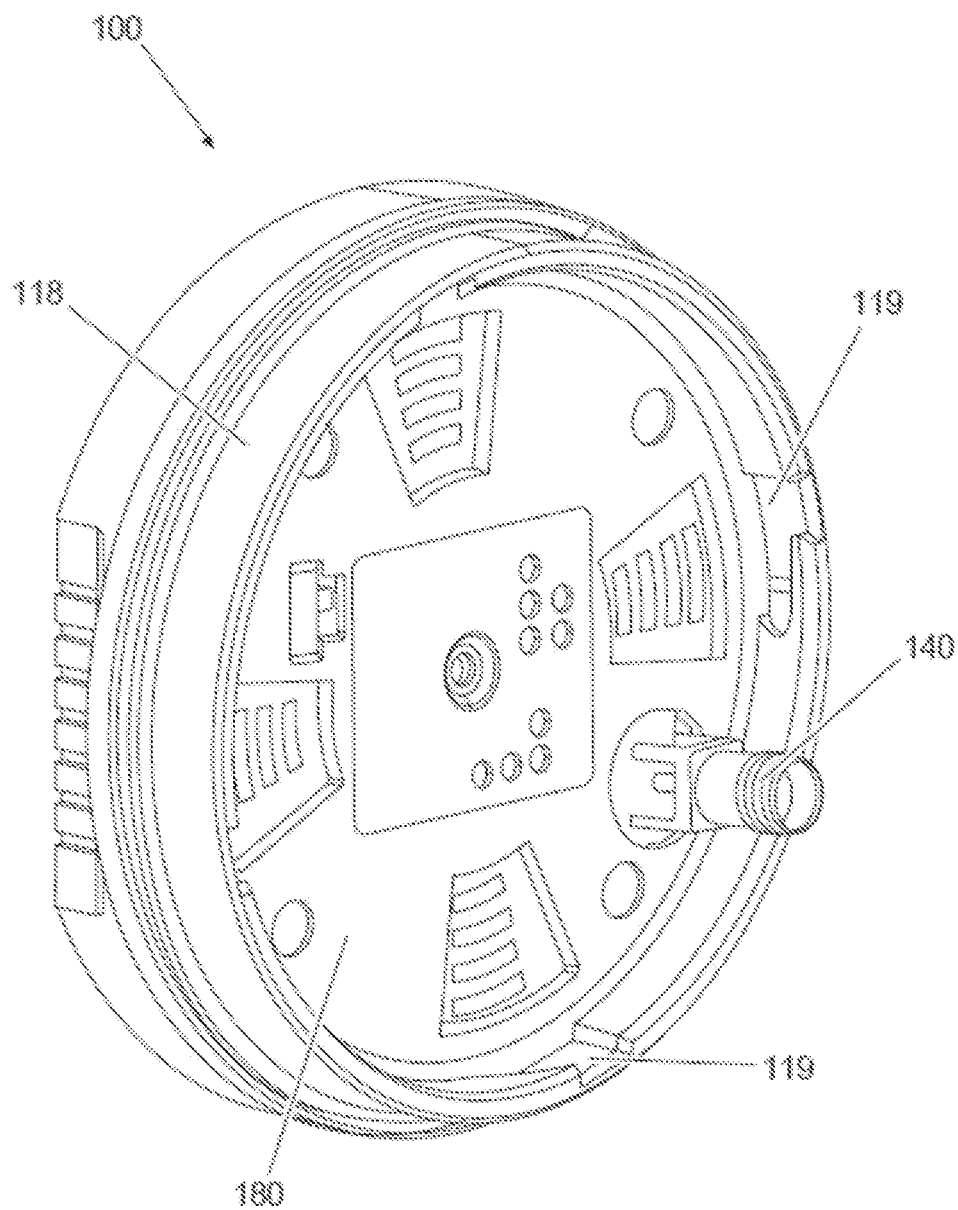
FIG. 5 shows a schematic sketch of a display and operating module with a connecting element and further elements according to a further embodiment.
Figure 6:
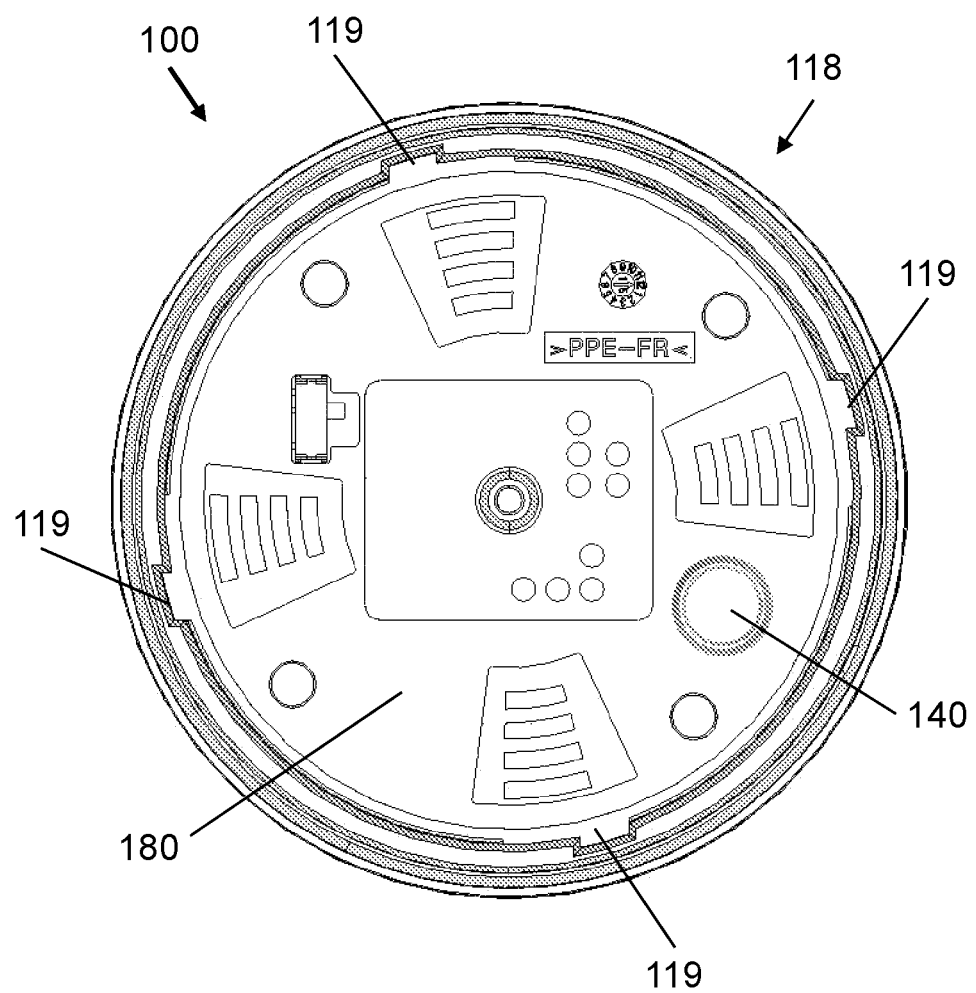
FIG. 6 shows a schematic sketch of a display and operating module with a connecting element according to a further embodiment in rear view.

FIG. 5 shows a schematic sketch of a display and operating module 100 with a connecting element 140 and further elements according to a further embodiment in a lateral bottom view. In this embodiment, the connecting element 140 is fixed to a printed circuit board 180. Furthermore, bayonet catches 119 are shown, which are arranged on an annular element of the lower part 118, so that a simple removal or detachment and/or attachment of the display and operating module 100 can be accomplished by turning. This supports the aforementioned concept of the modular system. FIG. 6 shows a rear view of the elements of the lower part 118 shown in FIG. 5.

Figure 7:
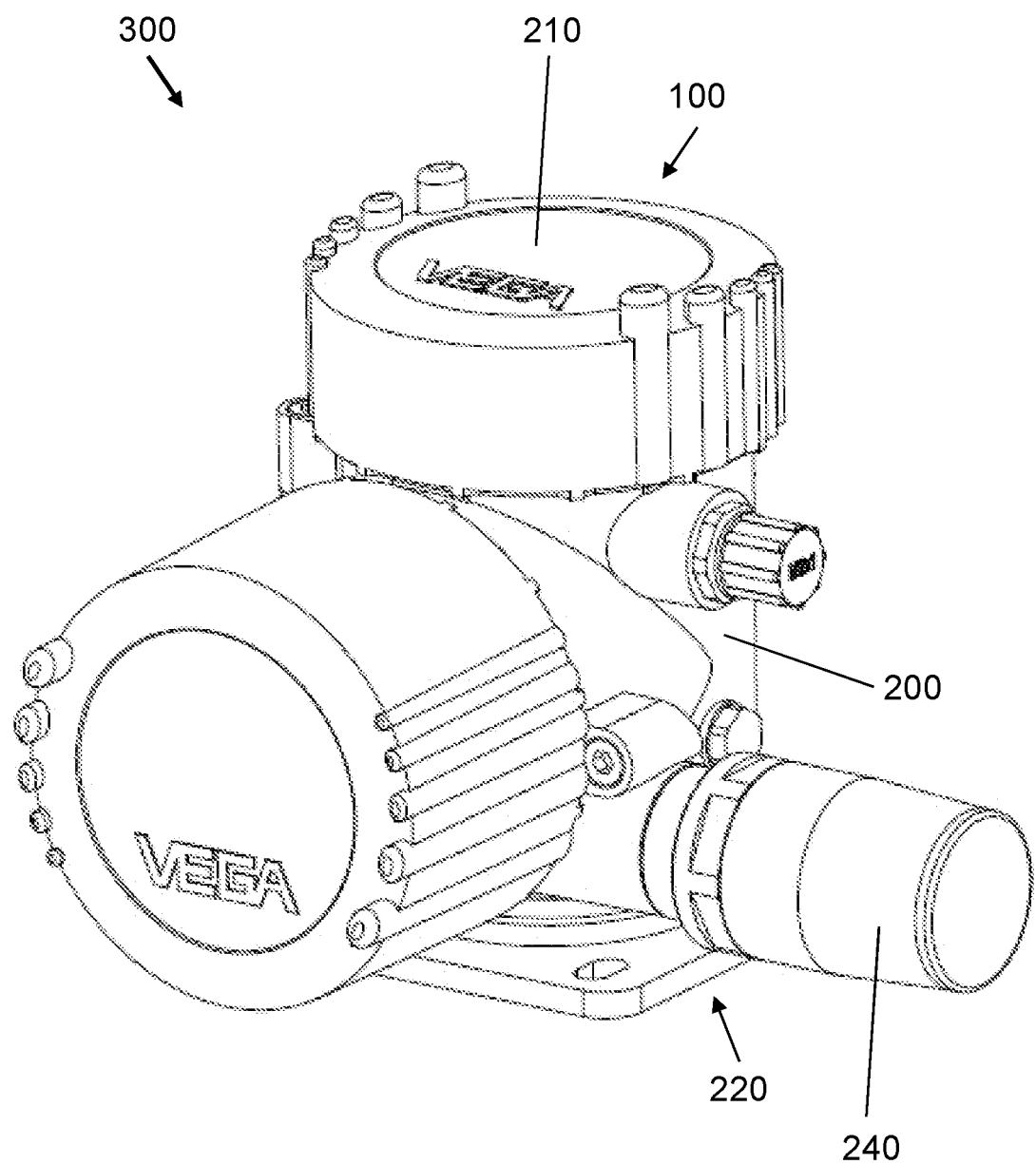
FIG. 7 shows a schematic sketch of a field device according to an embodiment in perspective side view.

FIG. 7 shows a schematic sketch of a field device 300 according to one embodiment in perspective side view. The field device 300 has a robust, metal sensor housing 200. A display and operating module 100 is arranged in the sensor housing 200 and is protected by the metal housing 200. The metal housing 200 may have non-metallic parts, such as the viewing window 210, through which a view of a display 115 (see, for example, FIG. 1) is possible. In one embodiment, the viewing window may be replaced by an opening so as to allow operation of the control buttons 116. If the control buttons 116 are not directly accessible, operation of the field device 300 is possible via radio. An antenna 240 is arranged at a radio frequency housing feedthrough 220. If other frequency bands are used, the antenna may be of a different design.

Figure 8:
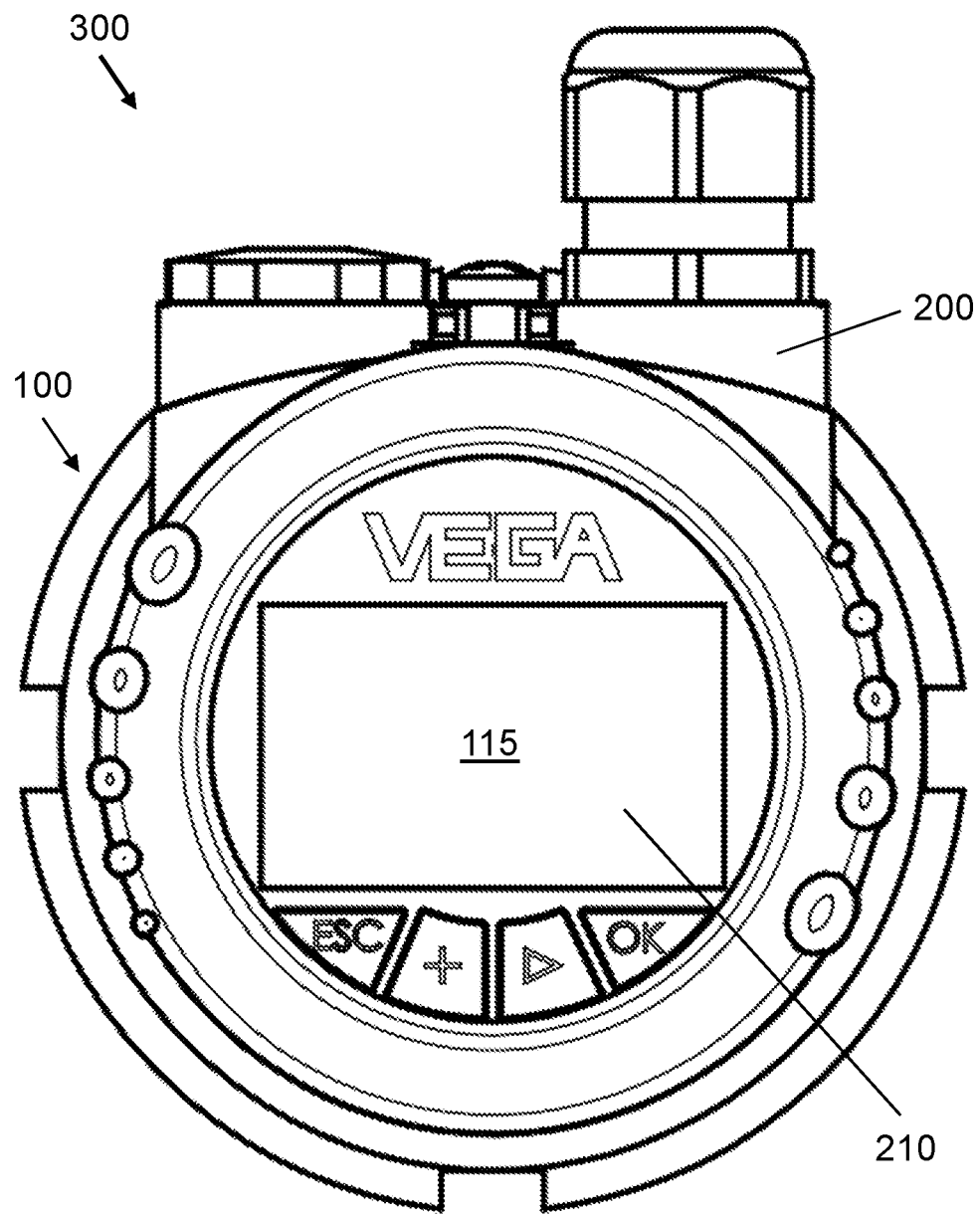
FIG. 8 shows a schematic sketch of a field device according to an embodiment in top view.

FIG. 8 shows a schematic sketch of a field device 300 according to one embodiment in plan view. The attached display and operating module 100 can be seen through a viewing window 210 in a metal housing 200.

Figure 9:
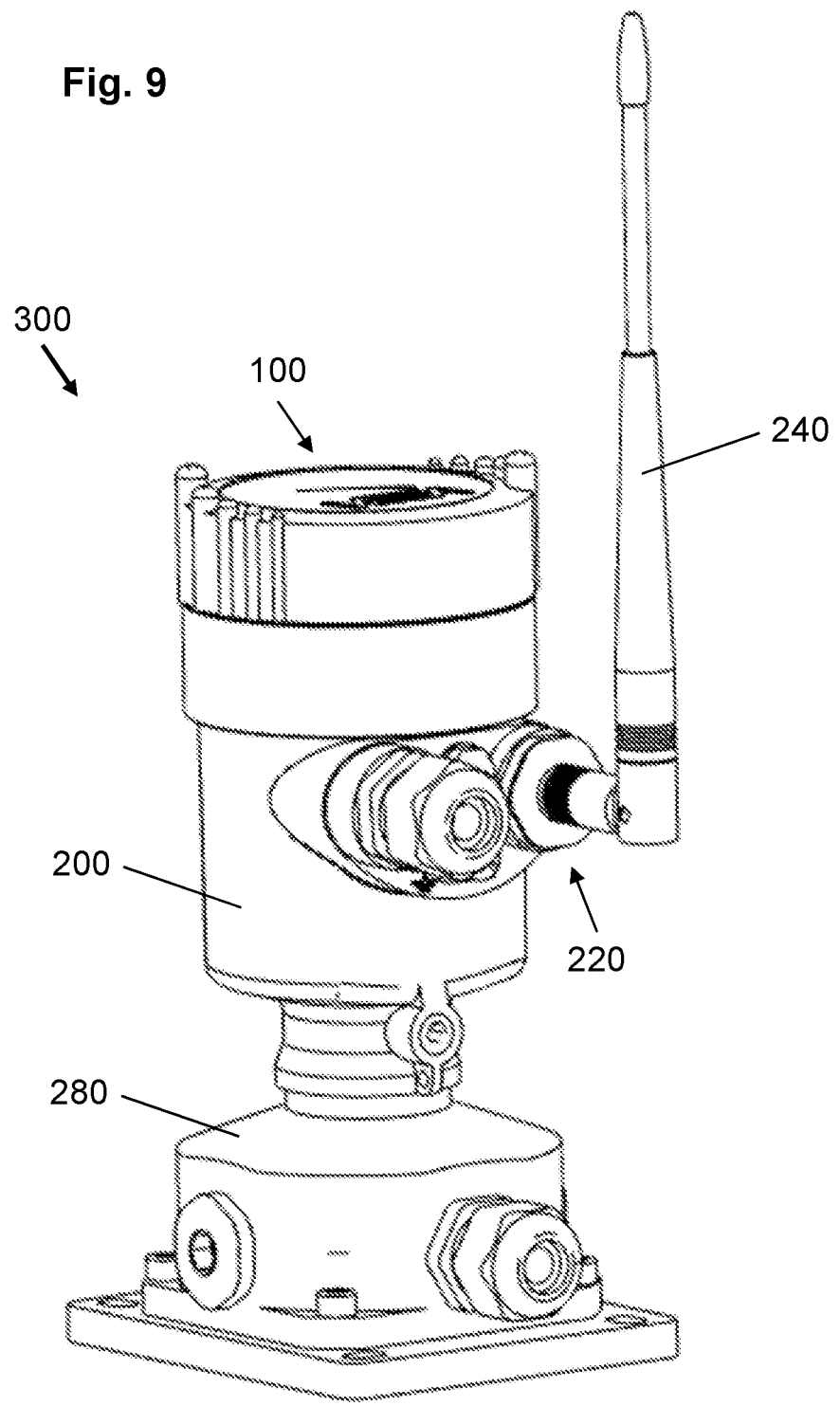
FIG. 9 shows a schematic sketch of a field device according to a further embodiment in perspective view.

FIG. 9 shows a schematic sketch of a field device 300 according to a further embodiment in a perspective view. Here, the sensor housing 200 completely accommodates the display and operating module 100 and the connecting element 140 (not visible), so that these elements are highly protected from damage by environmental influences by the sensor housing 200. A sensor device 280 is only partially contained by the metallic sensor housing 200 and has its own protection. An antenna 240 is arranged on a high frequency housing feedthrough 220, which is designed for a different frequency range than the antenna shown in FIG. 7 and therefore has a different shape. The high-frequency housing feedthrough 220 can have a similar or identical design to the one shown in FIG. 7.

Figure 10:
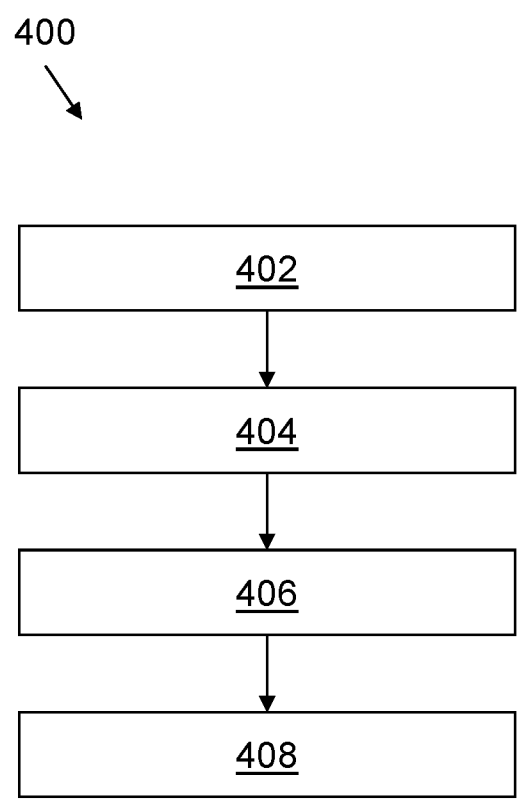
FIG. 10 shows a flow chart of a method of manufacturing a field device according to an embodiment.

FIG. 10 shows a flowchart 400 of a manufacturing process of a field device 300 (see, e.g., FIGS. 7 to 9) according to one embodiment. In a step 402, a sensor housing 200, in particular a metallic sensor housing, of the field device 300 is provided. In a step 404, a radio frequency housing feedthrough 220 connected to a connection counterpart 160 is arranged on the sensor housing 200. In a step 406, the connection counterpart 160 is connected to an electrical connection element 140, which in turn is connected to a removable display and operating module 100 comprising a radio module 120. In a step 408, the display and operating module 100 is arranged in the sensor housing 200, wherein the sensor housing 200 completely accommodates the display and operating module 100 and the connection element 140.

It should also be noted that the various embodiments may be combined with each other unless this is explicitly and/or technically impossible. It should also be noted that "comprising" and "including" do not exclude other elements or steps and that the indefinite articles "an" or "a" do not exclude a plurality. It should also be noted that features or steps described with reference to any of the above embodiments may also be used in combination with other features or steps of other embodiments described above. Reference signs in the claims are not to be regarded as limitations.

LIST OF REFERENCE SIGNS

100 Operating module
112 Upper part
114 Side handles
115 Display
116 Operator keys
118 Lower part
120 Radio module
140 Electrical connection element
145 Line
160 Connection counterpart
165 Line
180 Printed circuit board
200 Metallic sensor housing
210 Viewing window 220 High-frequency housing feedthrough
225 Line
240 Antenna
280 Sensor device
300 Field device, measuring device, measuring system
400 Flow chart
402-408 steps

The invention claimed is:

1. A removable display-and-operating module for a measuring device and/or a field device for level measurement or for limit level determination, the removable display-and-operating module comprising:
    a radio module; and
    an electrical connection element configured to form a detachable connection with a connection counterpart for transmitting radio frequency signals from the radio module to a radio frequency housing feedthrough and/or to an antenna of the measuring device and/or the field device.

2. The removable display-and-operating module according to claim 1,
    further comprising a printed circuit board, the electrical connection element being fixed on the printed circuit board.

3. The removable display-and-operating module according to claim 1,
    wherein the electrical connection element is connected to the removable display-and-operating module via a line.

4. The removable display-and-operating module according to claim 1,
    wherein the electrical connection element is a coaxial plug and the connection counterpart is a coaxial socket, or
    the electrical connection element is a coaxial socket and the connection counterpart is a coaxial plug.

5. The removable display-and-operating module according to claim 1,
    wherein the electrical connection element is further configured to transmit frequencies in an ISM band and/or a telecommunications band.

6. The removable display-and-operating module according to claim 1,
    wherein the electrical connection element is further configured to transmit frequencies between 30 MHz and 20 GHz.

7. The removable display-and-operating module according to claim 1,
    wherein the electrical connection element is further configured to transmit frequencies between 100 MHz and 5 GHz.

8. The removable display-and-operating module according to claim 1,
    wherein the display-and-operating module is configured to be disposed within a sensor housing.

9. The removable display-and-operating module according to claim 1,
    wherein the electrical connection element is further configured to transmit frequencies between 100 MHz and 10 GHZ.

10. A sensor housing for the field device for level measurement or for limit level determination, is the sensor housing completely accommodating the removable display-and-operating module comprising the radio module and the electrical connection element according to claim 1,
    the sensor housing comprising the radio frequency housing feedthrough configured to transmit radio frequency signals from the radio module and to connect to the antenna.

11. The sensor housing according to claim 10,
    wherein the radio frequency housing feedthrough is a coaxial plug or a coaxial socket.

12. The sensor housing according to claim 10,
    wherein the electrical connection element is a coaxial plug or a coaxial socket.

13. The sensor housing according to claim 10,
    wherein the antenna is configured to be integrated into the sensor housing.

14. A method of manufacturing a field device for level measurement or level limit determination, comprising the steps of:
    providing a sensor housing of the field device;
    arranging a radio frequency housing feedthrough and an antenna connected to a connection counterpart on the sensor housing;
    connecting the connection counterpart to an electrical connection element connected to a radio module of a removable display-and-operating module; and
    arranging the removable display-and-operating module in the sensor housing, wherein the sensor housing completely accommodates the removable display-and-operating module and the electrical connecting element.

15. The method according to claim 14, further comprising the steps of:
    disposing the antenna on the sensor housing; and
    connecting the antenna to the radio frequency housing feedthrough.

* * * * *